United States Patent [19]

Bose

[11] 4,094,770

[45] June 13, 1978

[54] PROCESS FOR REMOVING UNFILTERABLE SOLIDS FROM AN OIL

[75] Inventor: Phillip R. Bose, Pleasant Hill, Calif.

[73] Assignee: Chevron Research Company, San Francisco, Calif.

[21] Appl. No.: 809,135

[22] Filed: Jun. 22, 1977

[51] Int. Cl.² ............................................. C10G 21/16
[52] U.S. Cl. .................................. 208/251 R; 210/52
[58] Field of Search ..................... 208/8, 10, 251 R; 210/52, 54

[56] References Cited

U.S. PATENT DOCUMENTS

| | | | |
|---|---|---|---|
| 3,076,756 | 2/1963 | Papeski et al. | 208/251 R |
| 3,583,900 | 6/1971 | Gatsis | 208/8 |
| 3,598,717 | 8/1971 | Sunagel et al. | 208/8 |
| 4,028,219 | 6/1977 | Baldwin et al. | 208/8 |
| 4,029,567 | 6/1977 | Farnand et al. | 208/8 |

Primary Examiner—Delbert E. Gantz
Assistant Examiner—James W. Hellwege
Attorney, Agent, or Firm—D. A. Newell; R. H. Davies; D. L. Hagmann

[57] ABSTRACT

A process is provided for removing unfilterable suspended solids from an oil wherein these solids are agglomerated to separable conglomerated solids by adding to the oil an agglomerating agent comprising a mixture of acetone and 2-butanone.

8 Claims, 2 Drawing Figures

OIL-SUSPENDED SOLIDS REMOVAL PROCESS

PROCESS FOR REMOVING UNFILTERABLE SOLIDS FROM AN OIL

BACKGROUND OF THE INVENTION

1. Field

This invention relates to an improved process for removing suspended solids from an oil. More particularly, it relates to a process for producing a solids-reduced oil in which suspended solids in the oil are agglomerated by adding to the oil a solids-agglomerating agent comprising a mixture of acetone and 2-butanone and separating the conglomerated solids from the oil.

2. Prior Art

The need for an effective and economical method for removing suspended solids from a hydrocarbon oil is a continuing problem in the liquid hydrocarbon fuel art. This problem is especially notable in the case of synthetic liquid fuel production, for example in the production of liquid fuels as in the coal liquefaction and shale pyrolysis art. Raw-coal liquefaction extracts and shale oils and the like, usually contain appreciable amounts of finely divided suspended solids. These solids seriously interfere with the catalyzed oil processing steps normally required for satisfactory upgrading of these oils to useful fuels. The nature of the interference varies, depending upon the particular catalyst involved, including, for example, catalyst deactivation by poisoning active sites, pore plugging, reactor plugging and the like undesirable effects. Typically oil-suspendible solids have average diameters in the range below about 100 microns and are commonly described in the art as unfilterable solids because, as a practical matter, satisfactory separation thereof from the oil cannot be accomplished by usual mechanical separation techniques, including filtration, centrifugation and settling (see, for example, U.S. Pat. No. 3,997,425, Gatsis et al). A variety of treatments for oils containing suspended solids have been proposed in the art but, in general, each method suffers from some disadvantage. One group of related references discloses processes in which an oil containing finely divided suspended solids is fractionated into a hydrogen-rich fraction and hydrogen-poor fraction, usually by employing one or more selective solvents. Disadvantages of these processes include: (1) the development of multiple oil-containing process streams; (2) while the solids tend to become concentrated in a single process stream, nevertheless each stream usually contains some suspended solids; and (3) the selective solvents usually reject a portion of the raw oil, for example pitch, resins or polycyclic hydrocarbons which can constitute useful products as a result of subsequent hydrogenation and hydrocracking of the treated oil. Representative references in this group include (1) U.S. Pat. No. 3,018,241, E. Gorin; (2) U.S. Pat. No. 3,583,900, J. G. Gatsis; (3) U.S. Pat. No. 3,598,717, G. R. Funagel et al; and (4) U.S. Pat. No. 3,598,718, W. K. T. Gleim et al.

In another group of references, processes are disclosed wherein solids-contaminated oil is treated with water or an aqueous solution containing a chemical agent, for example a mineral acid. U.S. Pat. No. 3,232,861, E. Gorin et al, discloses a process for preferentially removing unfilterable solids using an aqueous solution of a mineral acid. U.S. Pat. No. 3,184,401, E. Gorin, suggests using an aqueous deashing agent. U.S. Pat. No. 4,012,314, W. M. Goldberger et al, discloses a process wherein the specific gravity of a liquid coal oil is reduced and by means of centrifugal action suspended solids in the oil are driven into the aqueous layer. Disadvantages in employing aqueous solutions include (1) a preferential treatment for the removal of only certain solids leaves undesirable residual suspended solids in the oil; (2) the separation of oil and water phases, especially where suspended finely divided solids are present, is usually beset by the formation of cuff-layers at the interface of the liquid phase; (3) acidifid aqueous solutions are unduly corrosive; (4) the resulting treated oil must usually be dried before it can be contacted with a catalyst in a subsequent catalyzed processing step; and (5) oil loss on solids is high.

Another group of references discloses processes in which an anti-solvent for a solids-precipitating agent is employed. In U.S. Pat. No. 3,010,893, M. D. Kulik, a process is disclosed for separating finely divided solids from low-temperature coal carbonization tars wherein a selective solvent added to the oil rejects (precipitates) a portion of the oil. The rejected oil acts as a binder for the solids, forming a tacky solid therewith. In U.S. Pat. No. 2,774,716, M. D. Kulik, a process is disclosed in which a solids-precipitating solvent, a recycle fraction from the process stream, is added to the oil. U.S. Pat. No. 3,535,224, R. S. Corey et al, discloses adding a chlorinated hydrocarbon to the oil as a solids-precipitating agent. U.S. Pat. No. 2,144,409, M. Pier et al, discloses a process for removing solids and hard asphalts from an oil by adding $C_6$–$C_{10}$ hydrocarbon solvent to the oil, the latter being at a temperature near the critical temperature of the $C_6$–$C_{10}$ hydrocarbon. U.S. Pat. No. 3,162,594, E. Gorin, discloses a process for removing solids from a non-distillable liquefied coal extract by catalytically hydrogenating the extract, thereby forming a non-destillable liquid containing less ash sized below 0.01 micron in diameter. U.S. Pat. No. 3,687,837 and U.S. Pat. No. 3,790,467, R. J. Fiocco et al, disclose partially precipitating solids or partially clarifying liquefied coal extracts by recycling a selected fraction of the clarified coal extract. The –467 patent discloses that the precipitated ash contains extractable organic constituents. U.S. Pat. No. 3,791,956, E. Gorin et al, provides a background of the solids-removal prior art and a process for removing suspended solids from a coal liquefaction oil wherein a precipitating solvent is added. U.S. Pat. No. 3,997,425, J. G. Gatsis et al, discloses a process for precipitating suspended solids from a liquefied coal oil by adding a light aromatic solvent to the oil.

A number of disadvantages are experienced in the use of ordinary solids-precipitating solvents, anti-solvents and the like, including (1) usually the precipitate is a tacky solid or semi-solid, for example an asphaltene, resinous solvent, etc., the latter functioning as a binder for agglomerated formerly suspended solids; (2) tacky solids undesirably adhere to surfaces of process equipment; (3) rejected portions of the oils represent an appreciable loss of product; (4) a precipitating agent such as a chlorinated hydrocarbon is often a source of corrosive hydrochloric acid in downstream process steps, the acid arising as a degradation product under severe processing conditions required to upgrade a raw oil; (5) chlorinated hydrocarbons under mild non-degrading conditions are undesirable persistent environmental pollutants; (6) a partial removal of suspended solids relative to an essentially complete removal is unsatisfactory.

The above-identified United States Patents are hereby referred to and are incorporated herein by reference thereto.

It is an object herein to provide a process for effectively separating unfilterable suspended solids from a non-distillable oil.

Another object is to carry out the aforesaid separation with essentially complete recovery of the oil.

A yet further object is to carry out the aforesaid separation without fractioning the oil into hyrogen-rich and hydrogen-poor fractions.

SUMMARY OF THE INVENTION

In the present invention a process is provided for separating suspended unfilterable particulate solids from an oil, preferably an undistillable oil, comprising:

(1) agglomerating said solids by admixing said oil with an agglomerating agent wherein the resulting mixture contains for each volume of said oil an amount of said agent in the range of from about 0.05 to 3 volumes, said agent comprising a mixture of acetone and 2-butanone and containing, for each 100 volumes of acetone plus 2-butanone, at least 2 volumes of acetone and at least 2 volumes of 2-butanone, said admixing being at a temperature in the range of from about 20° to 160° C and at a pressure at least sufficient to maintain said agent in the resulting liquid-solid mixture;

(2) forming a solid-reduced oil containing said agent by separating said agglomerated solis from said resulting mixture;

(3) separating said agent from said solids-reduced oil by vaporizing said agent; and (4) using as at least a portion of said agent in step (1) at least a portion of said separated agent.

By "unfilterable particulate solids" as used herein is meant by definition solids sized in the average diameter range below about 100 microns. Such solids suspend readily in an oil, especially in raw synthetic crude oils. Separation from the oil of these minutely sized solids by techniques is not satifactory in a practical, economic sense, because they readily obstruct the paper, fabric or cake used for the filtration or do not settle upon long standing.

By "non-distillable hydrocarbonaceous liquid or oil" as used herein is meant by definition an oil which is non-distillable without decomposition, such as coal liquefaction extract, shale oils and the like. Such oils typically contain appreciable amounts (at least about 5 weight percent) of one or more components which under ordinary distillation conditions thermally crack or polymerize and thermally crack, usually forming unsatisfactoru degradation products such as coke.

DETAILED DESCRIPTION

OIL FEEDSTOCKS

Figure 2:
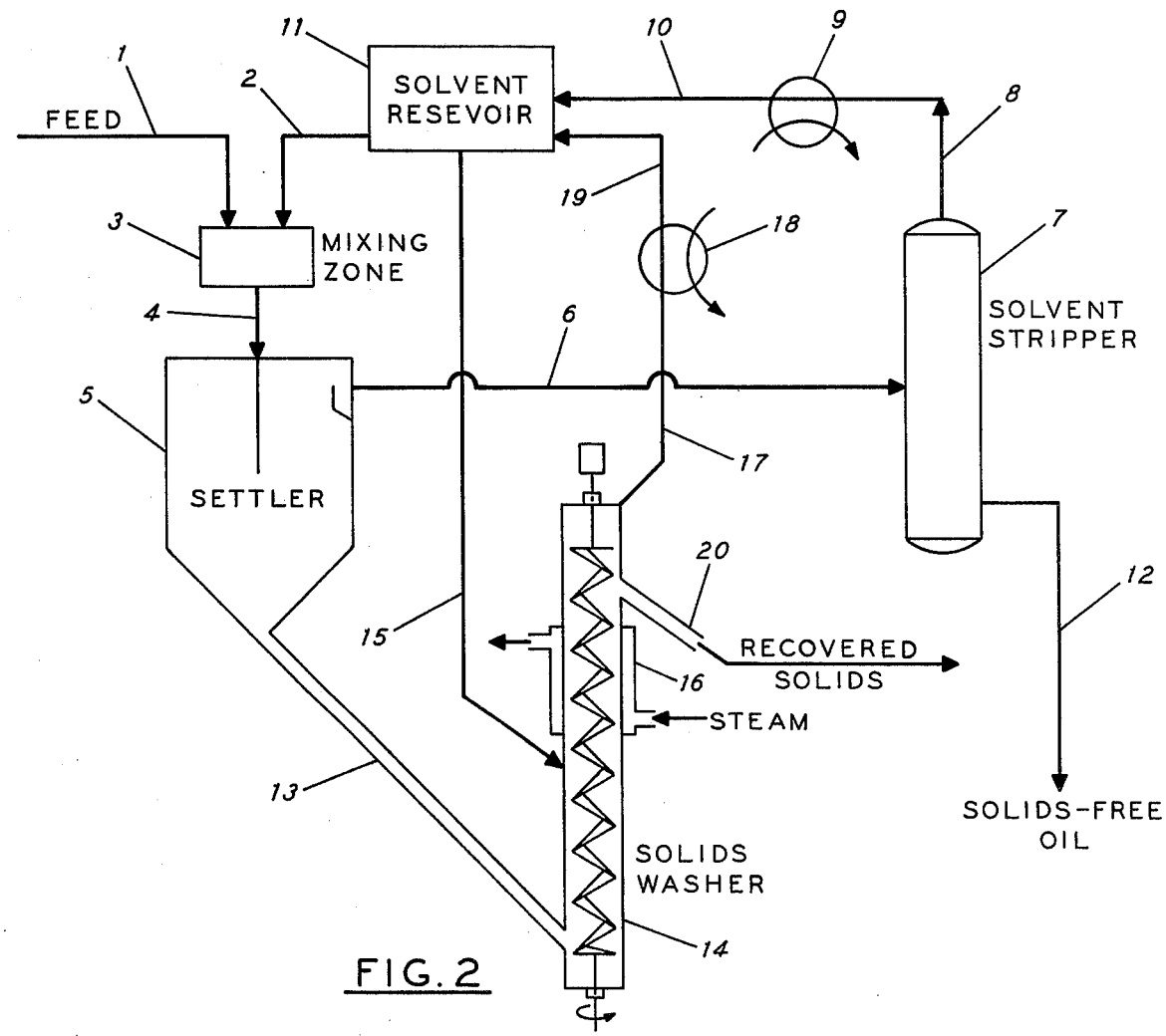
FIG. 2 is a schematic flow diagram illustrating a preferred embodiment of the inventive process.

Hydrocarbonaceous oils containing unfilterable suspended solids are, in general, suitable feedstocks for the process of the invention and are contemplated for such use. Especially advantageous results may be achieved herein when the feed is an undistillable oil. Effective removal of suspended solids from these oils enables the processor to upgrade a raw solids-reduced oil using costly catalysts without the necessity of a prior distillation step and without a substantial loss of desirable product precusors. Representative of these catalysts are the hydrocarbon hydrotreating catalysts normally used to remove sulfur- and nitrogen-containing impurities from an oil and/or to at least partially hydrogenate an oil prior to a hydrocracking step and the like.

Finely divided oil-suspended solids, in general, are effectively removed from the oil by the process of the invention. Those common properties which engender oil suspendability of these particles, for example particle size, density, charge and the like, are also believed to render them susceptible to effective agglomeration and removal by the present process. Representative solids include mineral ash-forming impurities, coal, coke, carbonaceous solids, catalyst and spent shale fines, natural and synthetic mineral oxides, organic and inorganic salts, mixtures thereof, and the like in particulate form and sized in the average diameter range below about 100 microns, especially below about 60 microns.

Representative suspended-solids-containing oils suitable for use herein include shale oil, coal liquefaction oils as from extraction, hydrogenaton, thermal treatment and combinations thereof, tar sand oils, pretroleum refinery decant oils such as fractionator bottom oils from a fluid catalytic cracking process, bottoms fractions of said oils, mixtures thereof, and the like oils. In addition to unfilterable suspended solids, oils suitable as feedstocks for the process of the invention may also contain filterable solids up to substantial amounts, for example having a total solids content up to about 50 weight percent, the unfilterable solids component thereof representing at least about 0.01, preferably at least 0.1, weight percent of the solids-oil mixture. Preferred feedstocks herein have an unfilterable-solids content in the range of from about 1 to 20 weight percent.

Desirably, but not necessarily, the feedstock oil herein contains little or none of a low-boiling component. The absence of low-boiling hydrocarbonaceous materials from the oil facilitates continuous recovery and recycle of the agglomerating agent (solvent) to the process without a need for intermediate treatment thereof for purposes of purification or concentration. Preferred oil feedstocks have, at one atmosphere pressure, an initial boiling point above about 93° C, and more preferably above about 100° C. Water need not be absent from the feedstock oil, especially dissolved water. On the other hand, the presence of undissolved water, that is of a separate water phase, is at least inconvenient because of the usual multiple liquid phase separation problems associated therewith. Therefore, unfilterable-solids-containing feedstock oils having an initial boiling point above 100° C and containing at most but a minor amount (less than 1 weight percent) of filterable (average diameter greater than 100 microns) solids are preferred for use herein.

The Agglomerating Agent

A prime feature of the present process is the discovery of a unique solids-agglomerating agent. A solids-agglomerating agent, to be useful and effective in this service, must promote essentially complete removal of unfilterable solids from an oil and at the same time must leave the oil virtually intact. In general, known solvents employed for recovering solids from an oil do not meet the latter requirement. The failure of these solvents is manifest in their inability to effectively solubilize both paraffinic-type hydrocarbons and asphaltene-type hydrocarbons. In addition, an appreciable portion of the oil is usually rejected (a loss to the process of desirable product precursors) in the form of tacky or flocculent solids.

It has been discovered that mixtures of acetone and 2-butanone (methylethyl ketone — MEK) are effective agglomerating agents for unfilterable solids present in an oil and at the same time permit the oil to remain virtually intact and in a liquid system having but a single liquid phase.

Figure 1:
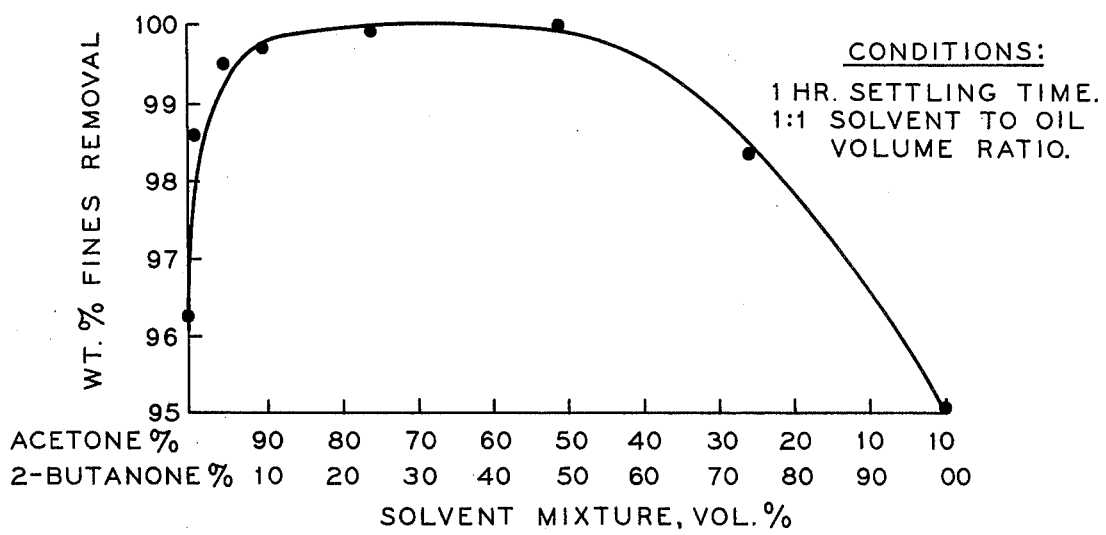
FIG. 1 is a summation of a series of experiments demonstrating the removal of unfilterable solids from an oil as a function of solvent concentration.

FIG. 1 is a summary of the results of a series of equipment which were carried out at ambient conditions of temperature and pressure using the solvent compositions, settling times an oil-to-solvent ratios as noted. The oil used in these examples was a coal liquefaction extract containing about 11 weight percent of unfilterable solids sized in the average diameters range of from about 1 to 60 microns. From a comparison of these data, it is notable that mixtures of 2-butanone and acetone, relative to either solvent individually, are surprisingly superior in promoting the separation of unfilterable solids from the oil. The settled fines, after removal of occluded oil, is essentially free of liquefied coal extract components. It is also notable that the addition of but a relatively minor amount of either acetone or 2-butanone to the other results in a solvent mixture having a greatly improved performance in promoting solids removal relative to the pure solvent.

The relative amounts of acetone and 2-butanone desirably present in the solvent mixture varies, depending upon process variables such as temperature, the particular oil being treated and the relative amount and sizing of the suspended solids. In general, a substantially improved agglomerating agent result wherein in parts by volume for each 100 volumes of acetone plus 2-butanone the agglomerating agent contains at least 2 volumes of acetone and at least 2 volumes of 2-butanone, preferably at least 10 volumes of acetone and at least 5 volumes of 2-butanone, and more preferably at least 45 volumes of acetone and at least 10 volumes of 2-butanone.

Solvent-to-Oil Ratio

Suitable solvent-to-oil ratio vary over a range, depending upon such process factors as (1) the temperature used; (2) the solids content of the oil; (3) the sizing of the suspended solids; and (4) the oil being processed. In general, a satisfactory agglomeration of suspended solids and effective recovery of the oil results when for each volume of oil an amount of agglomerating agent (solvent) in the range of from about 0.05 to 1 volume is used. Larger relative amounts of the agent may be used, for example as much as 3 volumes of agent per volume of oil or higher. However, as a matter of economic practicality, it is desirable to avoid the use of excessive amounts of solvent in order to save the work requirement in recovering the agent from the solids-reduced oil.

Temperature and Pressure

Temperature and pressure conditions suitable for use herein vary and, in general, must be such as to maintain the extraction agent in the oil in the liquid phase. Desirably, but not necessarily, the process temperature should be below the temperature at which there occurs an appreciable thermal decomposition of temperature-sensitive components of the oil. In general, satisfactory process temperatures are in the range below about 160° C, preferably in the range from about 20° to 160° C, and more preferably 100° to 110° C. Satisfactory pressures depend upon the temperatures employed and are, in general, in the range from about 1 to 50 atmospheres absolute, preferably from about 1 to 2 atmospheres.

EMBODIMENT

A preferred embodiment of the process of the invention is illustrated in FIG. 2, which is a schematic process flow diagram. Conventional auxiliary units, such as pumps, pressure reducers, valves, and the like, are omitted from this diagram.

A typical solids-containing feedstock for the process is an oil produced by hydrogenating pulverized coal in the presence of an extractive hydrocarbon solvent, for example of the well-known hydrogen-donor type. This oil has an initial boiling point of about 105° C. The suspended solids in this oil are sized in the average diameter range of from about 1 to 60 microns. These solids are a mixture of those oil-insoluble materials normally present in hydrogenated coal extracted oil, including, for example, one or more of fusain, ash, residual coal, partially hydrogenated coal, impurities such as metal oxides, sulfides and the like, and, if a catalyst is used to promote liquefaction of the coal, catalyst fines and the like. The suspended-solids content of these oils varies, and in a typical case is of the order of about 11 weight percent of the total mixture.

At rates sufficient to provide a resulting solution containing about equal volumes of oil and agglomerating agent (solvent), oil feed via line 1 and solvent via line 2 are introduced into mixing zone 3. If desired, mixing zone 3 may be fitted with an efficient stirring means (not shown) or, as an alternative, mixing zone 3 may be a common-carrier pipeline in which effective line mixing takes place during transit of the oil-solvent solution to settler 5. By heat exchanger and/or heating means not shown, including the use of indirect heat exchanger between feed and downstream process lines for effective conservation of process energy, the oil, solvents or oil-solvent solution is heated prior to introduction to settler 5 to provide a temperature in the settler in the range of from about 95° to 105° C. The autogenous system pressure in settler 5 and solids washer 14 is about 1.4 atmospheres absolute.

Flow rates and unit sizings in the process system are adjusted to provide an average residence time for the oil-solvent solution in settler 5 of about 1 hour at atmospheric pressure. This period is sufficient to result in a clarified upper portion which is removed as an effluent stream from settler 5 via line 6 which, for practical purposes, is essentially free of suspended solids. This effluent stream is delivered to solvent stripper 7, wherein the solvent present in the oil is flashed (stripped) from the oil. The resulting vaporized solvent is withdrawn as an overhead stream from stripper 7 via line 8 and delivered to solvent reservoir 11 via indirect heat exchanger 9 and line 10. The resulting solvent-free and fines-free oil is withdrawn from solvent stripper 7 as a bottoms stream via line 12 for further processing as desired, for example by hydrotreating, hydrogenation and or hydrocracking to produce a fuel oil. Typically, the oil contains no more than about 0.05 weight percent of solids.

Settled solids in settler 5 are withdrawn therefrom via line 13 and delivered to solids washer 14 as a sludge-like mixture which is mainly agglomerated and settled particulate solids containing occluded and entrained oil-solvent solution. Solids washer 14 is fitted with a rotatable auger-like element which upon being rotated at a suitable rate lifts the sludge upwardly in washer 14 wherein a downcoming stream of solvent introduced via line 15 removes occluded oil from the sludge and provides a quiescent and non-turbulent liquid stream flow in line 13 which is countercurrent to the downward flow of the sludge therein. The liquid stream returns the occluded or entrained oil to the settler 5. The rising stream of solids in solids washer 14 passes through an intermediately located zone therein which is surrounded by indirect heat exchange element 16. Sufficient heating of the rising solids stream is effected in this zone to vaporize residual solvent from the solid. The resulting solvent is withdrawn via line 17 from washer 14 as an overhead stream for delivery via line 19 to reservoir 11 after cooling and condensation effected by passage through indirect heat exchange 18. As an alternative to cooling and condensation of the hot vapor in line 17, this vapor may, at least in part, be introduced into mixing zone 3, thereby providing heat and at least a portion of the solvent required to produce the solution introduced into settler 5.

The solvent-and-oil-free agglomerated solids washed in washer 14 are within therefrom via line 20 for discharge and/or further treatment as desired. Typically these solids contain no more than about 0.01 and 0.05 weight percent, respectively, of oil and solvent.

Oil-Agglomerated Solids Separation

The separation of agglomerated solids from the oil may be carried out by any suitable means. For reasons of cost, gravitationally induced settling in a settling tank or zone is a prefererrd means. Other suitable means include filtration, centrifugation and the like, under conventional conditions therefor. The resulting agglomerated solids in general are readily separated from the oil under these conditions. It is within the intent herein to employ a combination of separating means, such as a partial settling and centrifuging or filtering portions thereof and the like.

The time required for effective settling of the solids varies, depending upon such factors as (1) the amount of agent employed, (2) the particle sizing of the suspended solids, and (3) the temperature of the oil-solids mixture. Satifactory settling is, in general, experienced at holding times in the range of from about 0.5 to 120 minutes and higher with the mixture at a temperature in the range of from about 20° to 160° C wherein (1) the shorter holding times corresond to the higher temperatures; (2) the longer holding times correspond to the lower temperatures; and (3) intermediate holding times correspond to intermediate temperature in said range. In the table below are listed the results of settling examples in which the solvent was a 24/75 volume mixture of 2-butanone and acetone, respectively, and the holding time was 6 minutes. The feed was a coal liquefaction extract containing about 11 weight percent of suspended solids.

TABLE

| Temperature Effect on Suspended Solids Agglomeration | | | | | |
|---|---|---|---|---|---|
| | | | Agglomerated & Extracted Fines | | |
| Temp, °C | Pressure, Atm. Abs. | Solids, Wt. %* | Oil, % | Solvent, % | Diameter, microns |
| 20 | 1 | 1.7 | — | — | 7.5 |
| 99 | 2.7 | 0.05 | 0.01 | 0.007 | 12.7 |
| 130 | 4.4 | 0.05 | 0.004 | 0.006 | 15.5 |
| 160 | 6.1 | — | 0.0008 | 0.0002 | — |

*Remaining in Oil

What is claimed is:

1. A process for separating unfilterable, particulate solids from an oil, comprising:
   (1) agglomerating said solids by admixing said oil with an agglomerating agent wherein the resulting mixtue contains for each volume of said oil an amount of said agent in the range of from about 0.05 to 3 volumes, said agent comprising a mixture of acetone and 2-butanone and containing, for each 100 volumes of acetone plus 2-butanone, at least 2 volumes of acetone and at least 2 volumes of 2-butanone, said admixing being at a temperature in the range of from about 20° to 160° C and at a pressure at least sufficient to maintain said agent in the resulting liquid-solid mixture;
   (2) forming a solids-reduced oil containing said agent by separating said agglomerated solid from said resulting mixture;
   (3) separating said agent from said solids-reduced oil by vaporizing said agent; and
   (4) using as at least a portion of said agent in step (1) at least a portion of said separated agent.

2. A process as in claim 1 wherein said oil is selected from the group consisting of shale oils, coal liquefaction oils, tar sand oils, refinery decant oils, distillation bottoms fractions of said oils, and mixtures thereof.

3. A process as claim 1 wherein said oil has an initial boiling point above about 93° C at 1 atmosphere pressure.

4. A process as in claim 1 wherein said oil has an initial boiling point above about 100° C at 1 atmosphere pressure, a total solids content below about 50 weight percent and an unfilterable-solids content of at least about 0.01 weight percent.

5. A process as in claim 1 wherein said separating is carried out by gravitationally induced settling by holding said resulting liquid-solid mixture in a settling zone for a period in the range of from about 0.5 to 120 minutes.

6. A process as in claim 1 wherein said separating is carried out using a combination of separating means under conventional oil-solid separating conditions.

7. A process as in claim 1 wherein (1) said amount of agent per volume of said oil is in the range of from about 0.5 to 1 volume; (2) said mixture of acetone plus 2-butanone contains at least 45 volumes of acetone and at least 10 volumes of 2-butanone; and (3) said oil has an unfilterable-solids content in the range of from about 1 to 20 weight percent.

8. A process for separating unfilterable solids from a hydrogenated coal extract oil containing about 11 weight percent of said solids and having an initial boiling point of about 105° C, comprising:
   (1) agglomerating said solids by admixing about equal volumes of said oil and of an agglomerating agent containing acetone and 2-butanone in a volumetric ratio of about 75 to 25, respectively, said admixing being at a temperature in the range of from about 95° to 105° C and atmosphere pressure;

(2) holding the solids-liquid mixture resulting from step (1) in a settling zone for a residence time of about 1 hour, thereby producing a clarified and essentially solids-free upper portion of said mixture and a settled solids-containing lower portion of said mixture;

(3) withdrawing said upper portion from said zone and separating said portion into an overhead fraction comprising acetone and 2-butanone and a bottoms fraction comprising solids-reduced oil by stripping said upper portion in a solvent stripper;

(4) withdrawing said lower portion from said settling zone and removing residual oil therefrom by washing said withdrawn portion with an additional amount of said agglomerating agent, thereby producing a washed solids fraction free of oil and a wash liquid fraction containing a minor amount of oil; and (5) passing said wash liquid fraction to said solvent stripper.

* * * * *

UNITED STATES PATENT AND TRADEMARK OFFICE
CERTIFICATE OF CORRECTION

PATENT NO. : 4,094,770
DATED : June 13, 1978
INVENTOR(S) : Phillip R. Bose

It is certified that error appears in the above-identified patent and that said Letters Patent are hereby corrected as shown below:

Col. 3, line 29, "solis" should read --solids--.

Col. 3, lines 39-40, "by techniques" should read --by ordinary techniques--.

Col. 3, line 40, "satifactory" should read --satisfactory--.

Col. 3, line 52, "unsatisfactoru" should read --unsatisfactory--.

Col. 5, lines 13-14, "equipment" should read --experiments--.

Col. 7, line 5, "lifts the" should read --lifts and/or forces the--.

Col. 7, line 6, "introduded" should read --introduced--.

Col. 7, line 17, "resulting solvent" should read --resulting vaporized solvent--.

Col. 7, line 20, "exchange" should read --exchanger--.

Col. 7, line 27, "within" should read --withdrawn--.

Col. 7, line 52, "corresond" should read --correspond--.

Col. 8, line 15, Claim 1, "mixtue" should read --mixture--.

Col. 8, line 36, Claim 3, "as Claim 1" should read -- as in Claim 1 --.

Signed and Sealed this

Nineteenth Day of December 1978

[SEAL]

Attest:

RUTH C. MASON
Attesting Officer

DONALD W. BANNER
Commissioner of Patents and Trademarks